(12) United States Patent
Tsumura et al.

(10) Patent No.: US 11,175,200 B2
(45) Date of Patent: Nov. 16, 2021

(54) ROTATING BODY LOAD MEASURING DEVICE

(71) Applicants: MITSUBISHI HEAVY INDUSTRIES MACHINERY SYSTEMS, LTD., Kobe (JP); BRIDGESTONE CORPORATION, Tokyo (JP)

(72) Inventors: Takumi Tsumura, Hiroshima (JP); Jiro Agawa, Hiroshima (JP); Tatsuya Ueda, Hiroshima (JP); Makoto Tachibana, Hiroshima (JP)

(73) Assignees: MITSUBISHI HEAVY INDUSTRIES MACHINERY SYSTEMS, LTD., Kobe (JP); BRIDGESTONE CORPORATION, Tokyo (JP)

(*) Notice: Subject to any disclaimer, the term of this patent is extended or adjusted under 35 U.S.C. 154(b) by 224 days.

(21) Appl. No.: 16/486,362

(22) PCT Filed: Feb. 22, 2017

(86) PCT No.: PCT/JP2017/006544
§ 371 (c)(1),
(2) Date: Aug. 15, 2019

(87) PCT Pub. No.: WO2018/154646
PCT Pub. Date: Aug. 30, 2018

(65) Prior Publication Data
US 2020/0025651 A1 Jan. 23, 2020

(51) Int. Cl.
*G01M 17/02* (2006.01)
(52) U.S. Cl.
CPC ........ *G01M 17/022* (2013.01); *G01M 17/021* (2013.01)
(58) Field of Classification Search
None
See application file for complete search history.

(56) References Cited

U.S. PATENT DOCUMENTS 4,956,995 A * 9/1990 Harrold ............... G01M 17/022
73/146
5,067,348 A 11/1991 Himmler et al.
(Continued)

FOREIGN PATENT DOCUMENTS

CN 103245516 A 8/2013
DE 1248336 B 8/1967
(Continued)

OTHER PUBLICATIONS

PCT/ISA/210, "International Search Report for International Application No. PCT/JP2017/006544," dated May 30, 2017.
(Continued)

*Primary Examiner* — Andre J Allen
*Assistant Examiner* — Jermaine L Jenkins
(74) *Attorney, Agent, or Firm* — Manabu Kanesaka; Benjamin Hauptman; Kenneth Berner

(57) ABSTRACT

A rotating body load measuring device according to the present invention includes: a first support section which supports one end portion of a shaft body, which protrudes from one end face of a rotating body, so as to be immovable in a first direction and a second direction along a central axis; a second support section which supports the other end portion of the shaft body, which protrudes from the other end face of the rotating body, so as to be immovable in the first direction and movable in the second direction; and a measuring part capable of measuring a force acting in the first direction on at least one of the first support section and the second support section from the shaft body and capable of measuring a force acting in the second direction on the first support section from the shaft body.

10 Claims, 10 Drawing Sheets

(56) References Cited

U.S. PATENT DOCUMENTS

| | | | |
|---|---|---|---|
| 6,772,626 B1* | 8/2004 | Engel | G01M 1/225 |
| | | | 73/146 |
| 7,140,242 B1* | 11/2006 | Poling, Sr. | G01M 17/022 |
| | | | 73/146 |
| 10,197,475 B2* | 2/2019 | Okabe | G01M 17/022 |
| 2013/0205883 A1 | 8/2013 | Symens et al. | |
| 2014/0250996 A1 | 9/2014 | Wakazono et al. | |
| 2015/0143868 A1* | 5/2015 | Okada | G01M 17/02 |
| | | | 73/1.15 |
| 2015/0260613 A1 | 9/2015 | Okada et al. | |
| 2017/0153163 A1 | 6/2017 | Okada | |

FOREIGN PATENT DOCUMENTS

| | | |
|---|---|---|
| JP | S58-120148 A | 7/1983 |
| JP | S61-231431 A | 10/1986 |
| JP | H03-064823 B2 | 10/1991 |
| JP | 2890311 B2 | 5/1999 |
| JP | 5450475 B2 | 3/2014 |
| JP | 2015-232545 A | 12/2015 |
| JP | 6006067 B2 | 10/2016 |
| KR | 10-2014-0109305 A | 9/2014 |
| KR | 10-2016-0147875 A | 12/2016 |
| TW | 201437622 A | 10/2014 |

OTHER PUBLICATIONS

PCT/ISA/237, "Written Opinion of the International Searching Authority for International Application No. PCT/JP2017/006544," dated May 30, 2017.

\* cited by examiner

ROTATING BODY LOAD MEASURING DEVICE

RELATED APPLICATIONS

The present application is National Phase of International Application No. PCT/JP2017/006544 filed Feb. 22, 2017, the disclosure of which is hereby incorporated by reference herein in its entirety.

TECHNICAL FIELD

The present invention relates to a rotating body load measuring device for detecting a force acting on a columnar rotating body in a state where a main load is applied to the rotating body in a radial direction.

BACKGROUND ART

In tires manufactured through a vulcanization process or the like, a tire which satisfies a quality standard such as non-uniformity after the inspection of whether or not to satisfy the quality standard is shipped as a product. As a device for evaluating the non-uniformity of a tire, there is a tire uniformity machine. The tire uniformity machine is provided with a tire rotating shaft on which a tire is mounted, a frame, a load wheel which is supported on the frame so as to be rotatable around a wheel rotating shaft and in which a peripheral surface thereof is pressed against a tread of the tire mounted on the tire rotating shaft, a motor which rotates the tire, and a load cell which measures a load acting on the load wheel (refer to PTLs 1 and 2, for example). Here, the load cell is fixed between the wheel rotating shaft and the frame, so that it is possible to measure a load acting on the tire from the wheel and a variation in a load reaction force from the tire to the wheel.

Then, the non-uniformity of the tire can be evaluated by rotating the tire with the motor in a state where the load wheel is pressed against the tire, and measuring a load with the load cell. In the related art, in the tire uniformity machine, as measurement items for evaluating mainly non-uniformity, a radial force variation (hereinafter, referred to as RFV) which is a variation in a load in a radial direction of a tire, and a lateral force variation (hereinafter, referred to as LFV) which is a variation in a load in a width direction of a tire have been measured. Then, by measuring the RFV, the LFV, or the like, it is possible to evaluate the non-uniformity of the tire.

CITATION LIST

Patent Literature

[PTL 1] Japanese Unexamined Patent Application Publication No. 2015-232545
[PTL 2] Japanese Unexamined Patent Application Publication No. 61-231431

SUMMARY OF INVENTION

Technical Problem

Incidentally, not only a force which is generated by a load acting on the load wheel which is a rotating body but also a force which is exerted by deformation of the load cell and the wheel rotating shaft due to a temperature change acts on the load cell in the tire uniformity machine which is the rotating body load measuring device as described above. Specifically, if a temperature changes, the load wheel and the wheel rotating shaft expand and contract in a radial direction of the wheel and a direction along the wheel rotating shaft. Of these, with respect to the direction along the wheel rotating shaft, the load cell is fixed to the wheel rotating shaft and the frame, and therefore, the wheel rotating shaft trying to be displaced due to the expansion and contraction is restricted. For this reason, in the load cell, even if a load does not act on the load wheel, a measured value as if a load has acted on the load cell in the direction along the wheel rotating shaft due to deformation by a temperature change is measured. For this reason, if a temperature change occurs, the load acting on the load wheel which is a rotating body cannot be accurately measured, and thus there is a problem in that the non-uniformity of the tire cannot be accurately evaluated.

Therefore, the present invention provides a rotating body load measuring device capable of accurately measuring a load acting on a rotating body without being affected by a temperature change.

Solution to Problem

According to a first aspect of the present invention, there is provided a rotating body load measuring device for detecting a force acting on a rotating body that is formed in a columnar shape and rotates around a central axis of a shaft body protruding from a center of each of both end faces, in a state where a main load is applied to the rotating body in a first direction that is one direction in a radial direction, the rotating body load measuring device including: a first support section which supports one end portion of the shaft body, which protrudes from one end face of the rotating body, so as to be immovable in the first direction and a second direction along the central axis; second support section which supports the other end portion of the shaft body, which protrudes from the other end face of the rotating body, so as to be immovable in the first direction and movable in the second direction; and a measuring part capable of measuring a force acting in the first direction on at least one of the first support section and the second support section from the shaft body and capable of measuring a force acting in the second direction on the first support section from the shaft body.

In the rotating body load measuring device according to the above aspect, in a state where the main load is applied to the rotating body in the first direction that is one direction in the radial direction, a force acting on the rotating body is measured by the measuring part. Here, if a force acts on the first support section and the second support sectional from the shaft body, the measuring part can measure a component in the first direction of the force and can also measure a component in the second direction, based on the force acting on the first support section. Further, even if the rotating body and the shaft body expand or contract in the second direction along the central axis due to a temperature change, the other end portion of the shaft body, which is supported so as to movable in the second direction, can be moved in the second direction with one end portion supported by the first support section so as to be immovable in the first direction and the second direction as a base end. For this reason, a force in the second direction can be prevented from being detected by the measuring part due to the shaft body being restricted by the first support section and the second support section according to a temperature change. On the other hand, the measuring part can also accurately measure a force acting in the second direction, by measuring the force acting in the second direction on the side of the first support section which supports the measuring part so as to be immovable in the second direction.

Further, in a rotating body load measuring device according to a second aspect of the present invention, in the first aspect, the measuring part may include a first load cell capable of measuring forces acting in at least two directions of the first direction and the second direction and connected to the first support section and the one end portion of the shaft body so as to be immovable in the first direction and the second direction, and a second load cell capable of measuring a force acting in at least one direction of the first direction and connected to the other end portion of the shaft body, and the second support section may include a main body portion to which the second load cell is connected so as to be immovable in the first direction and the second direction, a guide connected to one of the shaft body and the second load cell so as to be immovable in the first direction and the second direction and disposed along the second direction, and a slider connected to the other of the shaft body and the second load cell so as tis be immovable in the first direction and the second direction and supported on the guide so as to be movable in the second direction.

In the rotating body load measuring device according to the above aspect, the force acting in the first direction can be measured by the first load cell and the second load cell which are supported on the corresponding first support section and second support section so as to be immovable in the first direction. Further, the force acting in the second direction can be measured by the first load cell supported on the first support section so as to be immovable in the second direction. Here, even if the load wheel and the shaft body expand or contract in the second direction due to a temperature change, the guide moves in the second direction with respect to the slider, whereby the deformation of the load wheel and the shaft body can be prevented from being restricted.

Further, in a rotating body load measuring device according to a third aspect of the present invention, in the second aspect, the guide may include a pair of guide surfaces disposed along the second direction so as to face in different directions from each other in a direction orthogonal to the second direction, and a pair of the sliders may be each provided so as to be supported to be movable in the second direction on each of the pair of guide surfaces.

In the rotating body load measuring device according to the above aspect, each of the pair of sliders is supported so as to be movable in the second direction on each of the pair of guide surfaces facing in different directions from each other in the direction orthogonal to the second direction, thereby being reliably guided in the second direction.

Further, in a rotating body load measuring device according to a fourth aspect of the present invention, the rotating body load measuring device according to the second or third aspect may further include: a control unit which calculates a load acting on the rotating body, based on measurement results of the first load cell and the second load cell, in which the control unit may calculate a load acting in the first direction on the rotating body, based on forces in the first direction measured by the first load cell and the second load cell, and calculate a load acting in the second direction on the rotating body, based on a force in the second direction measured by the first load cell.

In the rotating body load measuring device according to the above aspect, it is possible to calculate a load acting on the rotating body by the control unit, based on the measurement results by the first load cell and the second load cell.

Further, in a rotating body load measuring device according to a fifth aspect of the present invention, in any one of the first to fourth aspects, the rotating body load measuring device may be a tire uniformity machine which includes a tire that is a test object supported to be rotatable around a tire central axis, a columnar load wheel supported to be rotatable around an axis parallel to the tire central axis, so as to come into contact with a peripheral surface of the tire, and a rotation drive portion that rotationally drives either of the tire or the load wheel, and measures non-uniformity of the tire, based on a force that is measured in the measuring part with one of the tire and the load wheel as the rotating body and a load acting from the other of the tire and the load wheel as the main load.

In the rotating body load measuring device according to the above aspect, as the tire uniformity machine, it is possible to accurately measure a load acting on the contact point between the load wheel and the tire without being affected by a temperature change, with the load which is transmitted from the load wheel to the tire as main load, and to accurately evaluate the non-uniformity of the tire.

Advantageous Effects of Invention

According to the rotating body load measuring device described above, it is possible to accurately measure a load acting on the rotating body without being affected by a temperature change.

DESCRIPTION OF EMBODIMENTS

First Embodiment

[Configuration of Tire Uniformity Machine]

Hereinafter, an embodiment of the present invention will be described with reference to FIGS. 1 to 6.

First, the configuration of a rotating body load measuring device according to an embodiment of the present invention will be described. In this embodiment, a tire uniformity machine will be described as an example of the rotating body load measuring device according to the present invention.

(Overall Configuration)

Figure 1:
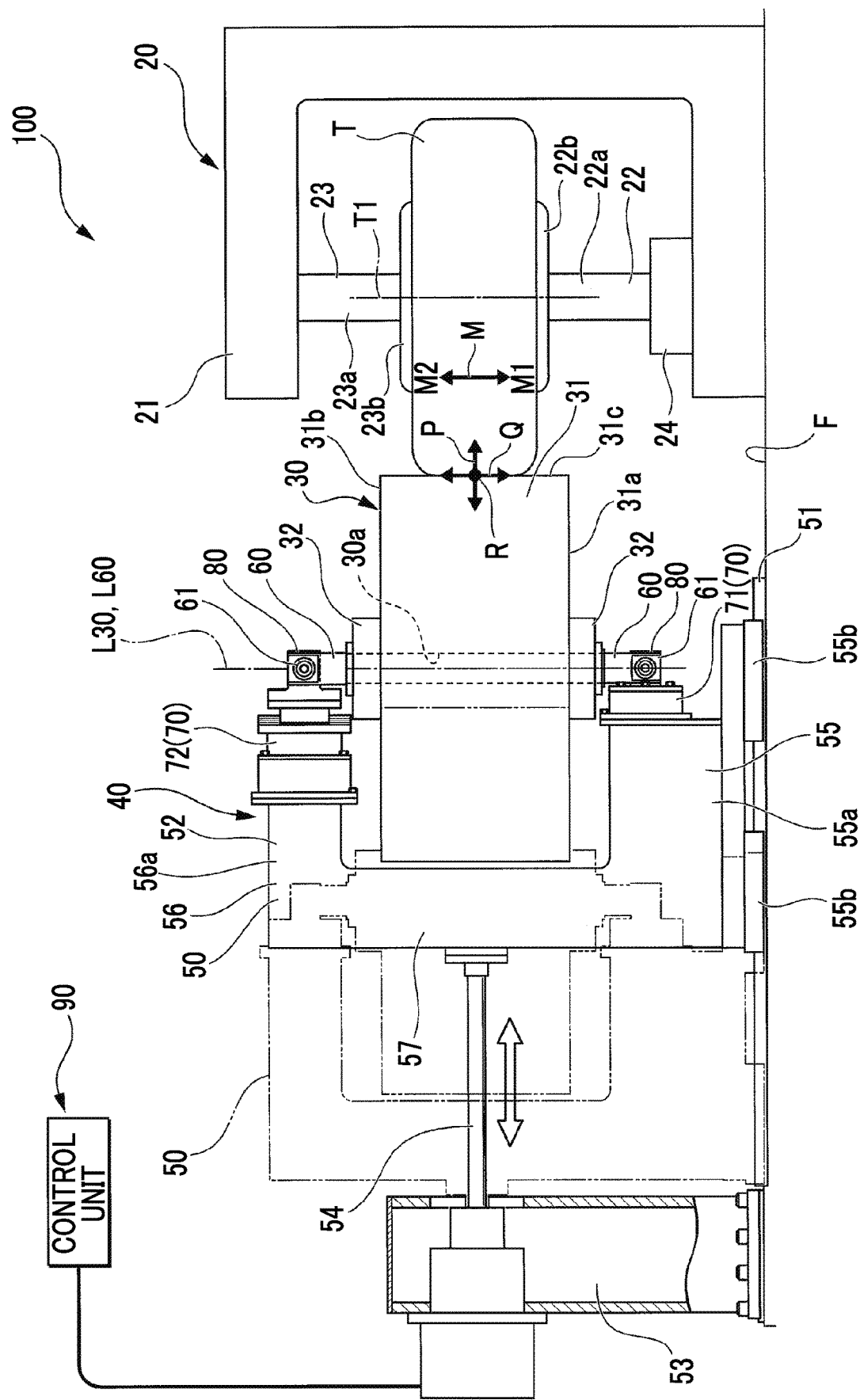
FIG. 1 is a schematic configuration diagram as viewed from the side, showing a tire uniformity machine according to a first embodiment of the present invention.

FIG. 1 shows a tire uniformity machine 100 of a first embodiment and is a device for evaluating the uniformity of a tire T by measuring the generated force while rotationally driving one of the tire T and a load wheel 30 and rotating the other of the tire T and the load wheel 30 in a driven manner, in a state where the tire T and the load wheel 30 are pressed against each other with a desired load, as the rotating body load measuring device. As shown in FIG. 1, the tire uniformity machine 100 of this embodiment is provided with a tire support part 20 which supports the tire T, the load wheel 30 which is a rotating body which is pressed against the tire T supported by the tire support part 20, a load wheel support part 40 which supports the load wheel 30, and a control unit 90.

(Tire Support Part)

The tire support part 20 is provided with a tire-side frame 21, a first support portion 22 disposed on one side M1 in a width direction M of the tire T and supported by the tire-side frame 21, a second support portion 23 disposed on the other side M2 of the tire T and supported by the tire-side frame 21, and a rotation drive portion 24. In this embodiment, the tire support part 20 supports the tire T such that the width direction N of the tire T is directed in an up-down direction, that is, a central axis T1 of the tire T is directed in the up-down direction, and the first support portion 22 supports the lower side of the tire T, and the second support portion 23 supports the upper side of the tire T. In the following, there is a case where description is made with the width direction M of the tire T as the up-down direction and with one side M1 in the width direction M of the tire T as the lower side and the other side M2 as the upper side.

The first support portion 22 is provided with a first rotary shaft 22a disposed along the width direction M of the tire T and rotatably supported on the tire-side frame 21, and a first rim 22b mounted on the first rotary shaft 22a and supporting a bead on the lower side of the tire T. The second support portion 23 is provided with a second rotary shaft 23a disposed along the width direction M of the tire T and rotatably supported on the tire-side frame 21, and a second rim 23b mounted on the second rotary shaft 23a and supporting a bead on the upper side of the tire T. Further, the rotation drive portion 24 is made so as to be able to rotate the first rotary shaft 22a by a motor (not shown).

That is, the tire T is supported to be clamped from both sides in the up-down direction by the first rim 22b and the second rim 23b of the tire support part 20, and in this state, the first rotary shaft 22a is rotated by the rotation drive portion 24, whereby the tire can be rotated around the central axis T1 of the tire T. Further, the second rotary shaft 23a of the tire support part 20 is movable from a support position where the second rim 23b supports the tire T to a retreat position where the second rim 23b is separated from the tire T, by a movement mechanism (not shown), and the second rotary shaft 23a moves to the retreat position, whereby it is possible to extract a measured tire T and mount an unmeasured tire T.

(Load Wheel)

The load wheel 30 is provided with a wheel body 31 formed in a columnar shape, and a bearing portion 32 mounted on the wheel body 31. In the wheel body 31 and the bearing portion 32, a through-hole 30a is formed coaxially with a central axis L30 of the wheel body 31. Here, the columnar shape is not limited to a flat, columnar shape in which a height dimension is small with respect to the diameter of the load wheel 30, the tire T, or the like, and is a concept including a columnar shape in which the diameter and the height dimension are the same or a columnar shape in which the height dimension is large with respect to the diameter and including even a cylindrical shape in which the inside is hollow. Further, the wheel body 31 is disposed such that the central axis L30 is along the up-down direction, both end faces 31a and 31b face toward the both sides in the up-down direction, and a peripheral surface 31c faces the tire T. Here, a direction in which the load wheel 30 and the tire T face each other, of radial directions of the load wheel 30 and the tire T, is referred to as a first direction P, a direction along the central axes of the load wheel 30 and the tire T, which is the up-down direction, is referred to as a second direction Q, and a direction orthogonal to the first direction P and the second direction Q is referred to as a third direction R.

(Load Wheel Support Part)

The load wheel support part 40 is provided with a wheel-side frame 50, a shaft body 60 which rotatably supports the load wheel 30, a measuring part 70 having a first load cell 71 and a second load cell 72 and capable of measuring a load acting on the tire T from the load wheel 30 and a variation in a load reaction force from the tire T to the wheel, and a fixing jig 80 which connects each of the first load cell 71 side and the second load cell 72 side to the shaft body 60. The wheel-side frame 50 is provided with a rail 51 disposed along the first direction P on a floor surface F, a frame main body 52 movably supported on the rail 51, a base portion 53 fixed to the floor surface F, and an advancing and retreating drive portion 54 which is provided at the base portion 53 moves the frame main body 52 in the first direction P. The advancing and retreating drive portion 54 can advance and retreat the wheel-side frame 50 with respect to the tire T along the first direction P by advancing and retreating a cylinder, a screw, or the like a driving source such as a hydraulic pressure or an electromagnetic actuator, for example.

(Shaft Body)

The shaft body 60 is disposed in the through-hole 30a of the load wheel 30 such that a central axis L60 is coaxial with the central axis L30 of the wheel body 31, and is supported so as to be rotatable relative to the bearing portion 32 of the load wheel 30. Further, both ends of the shaft body 60 protrude from the centers of both end faces 31a and 31b of the wheel body 31 toward both sides in up-down direction. As shown FIGS. 2 to 4, the shaft body 60 provided with first mounting portions 61 for mounting the fixing jigs on both upper and lower end portions. The first mounting portions 61 are disposed in a pair and to be spaced apart from each other in the third direction R with the central axis L30 of the load wheel 30 interposed therebetween. Further, in the pair of first mounting portions 61, communication holes 61*a* communicating with each other are formed so as to be coaxial with each other.

As shown in FIG. 1, the first load cell 71 is disposed on the lower side which is one side of the load wheel 30. Further, the second load cell 72 is disposed on the upper side which is the other side of the load wheel 30. The first load cell 71 and the second load cell 72 of this embodiment are capable of measuring a total of two component forces; a force in an X direction and a force in a Y direction orthogonal to the X direction. Each of the first load cell 71 and the second load cell 72 is disposed such that the X direction is set to be the first direction P and the Y direction is set to be the second direction Q.

The frame main body 52 is provided with a first support section 55 which is movably supported on the rail 51 and to which the first load cell 71 is connected, a second support section 56 to which the second load cell 72 is connected, and a third support section 57 to which the first support section 55 and the second support section 56 are fixed. In this embodiment, the frame main body 52 is formed in a laterally facing U-shape as a whole, in which the first support section 55 is fixed to a lower end of the third support section 57 disposed along the up-down direction which is the second direction Q, and extends in the first direction P, and the second support section 56 is fixed to an upper end of the third support section 57 and extends in the first direction P.

Figure 2:
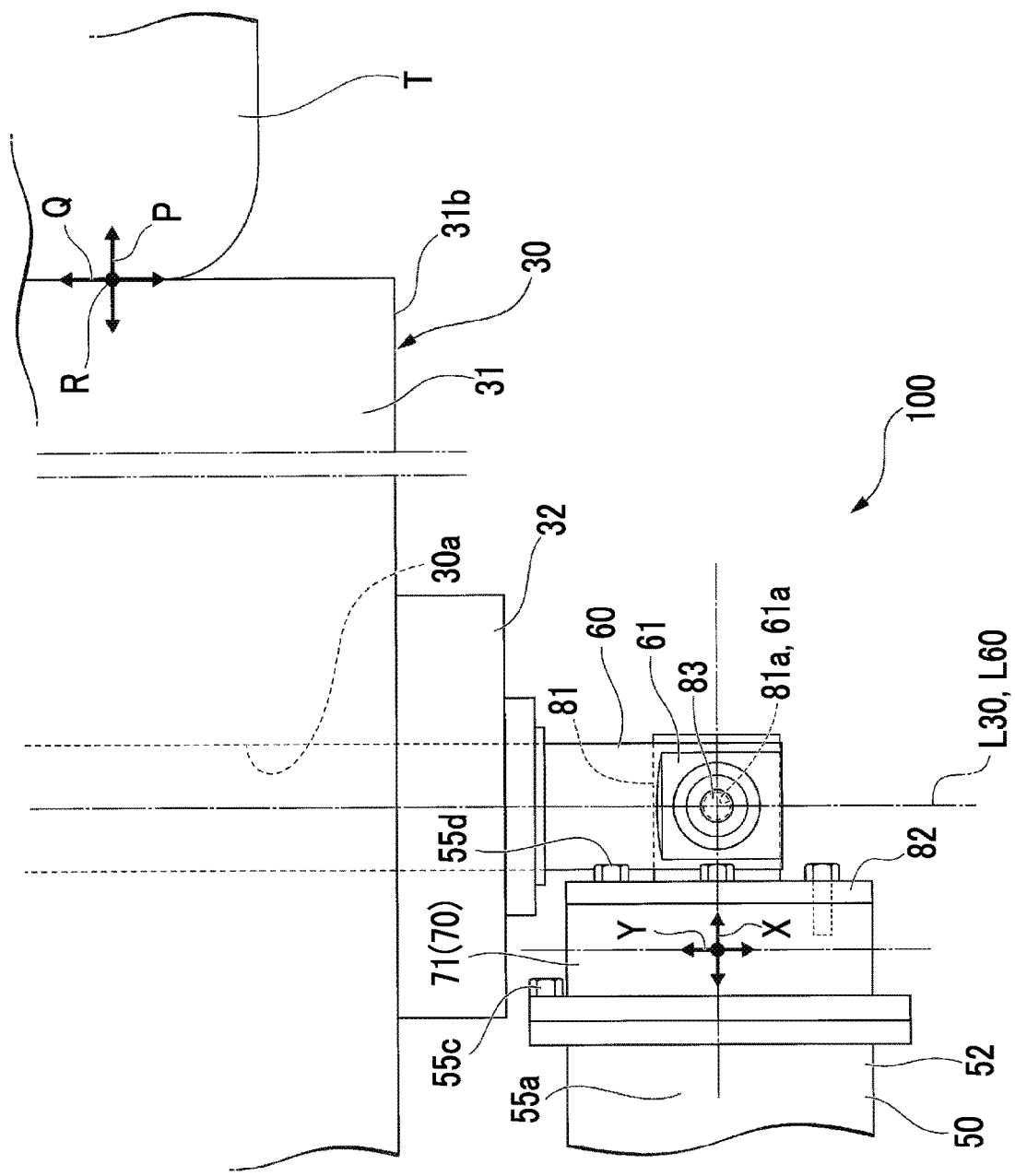
FIG. 2 is a side view showing details of a first load cell portion of the tire uniformity machine according to the first embodiment of the present invention.

The first support section 55 is provided with a main body portion 55*a* which is fixed to the third support section 57 and to which the first load cell 71 is connected, and a moving block 55*b* fixed to the main body portion 55*a* and movable on the rail 51 in the first direction P. As shown in FIG. 2, the main body portion 55*a* and the first load cell 71 are connected to each other by bolts 55*c* so as to be immovable in the first direction P and the second direction Q. Further, the first load cell 71 and the fixing jig 80 connected to the shaft body 60 are connected to each other by bolts 55*d* so as to be immovable in the first direction P and the second direction Q. By the above, the first support section 55 supports one end portion of the shaft body 60 through the first load cell 71 and the fixing jig 80 so as to be immovable in the first direction P and the second direction Q.

Figure 3:
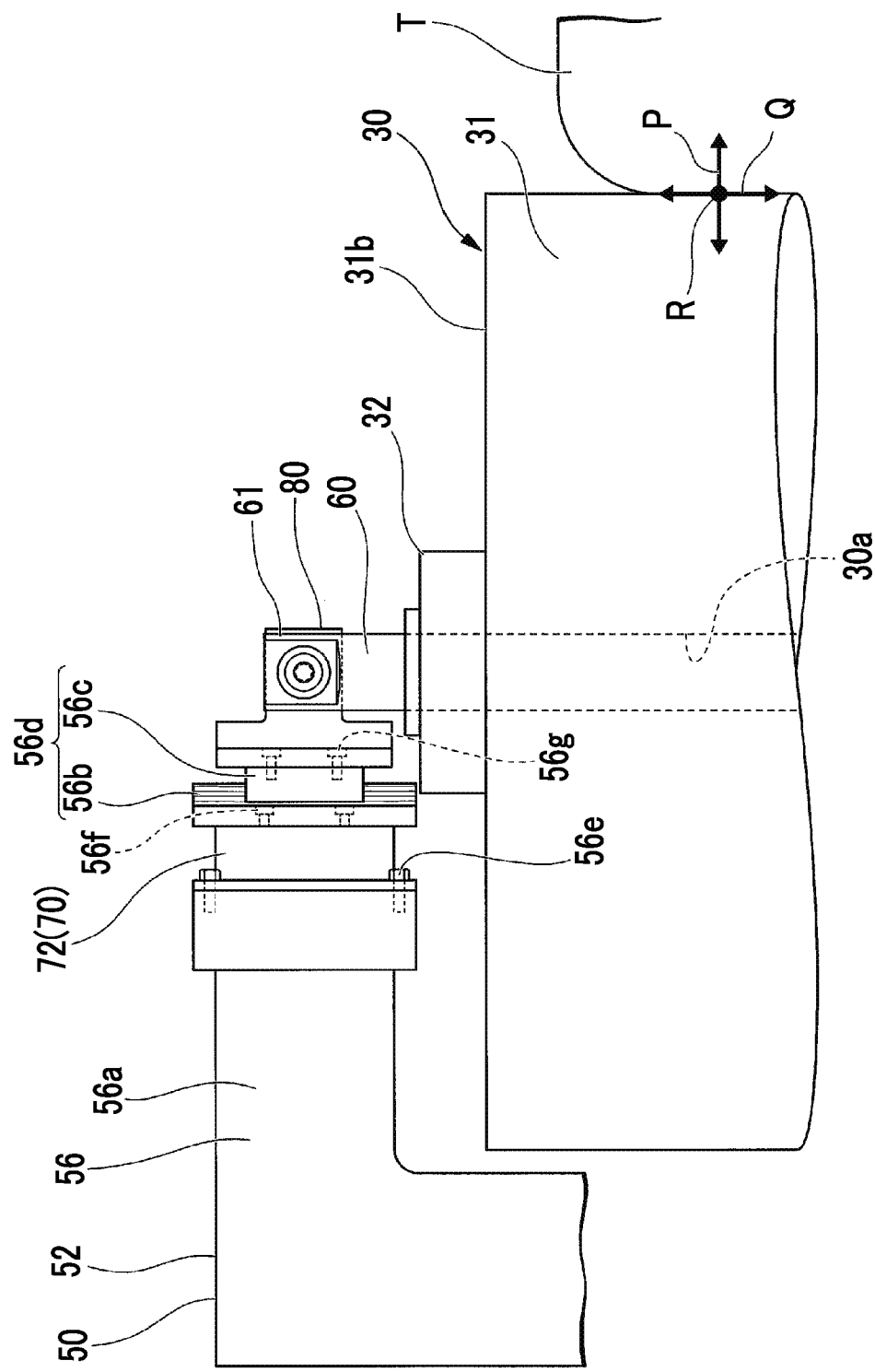
FIG. 3 is a side view showing details of a second load cell portion of the tire uniformity machine according to the first embodiment of the present invention.

Further, as shown in FIGS. 1 and 3, the second support section 56 is provided with a main body portion 56*a* which is fixed to the third support section 57 and to which the second load cell 72 is connected, a guide 56*b* to which the second load cell 72 is connected and which extends in the second direction Q, and a slider 56*c* supported by the guide 56*b* so as to be movable in the second direction Q. In this embodiment, a moving part 56*d* which supports the shaft body 60 so as to be movable in the second direction Q is configured of the guide 56*b* and the slider 56*c*. The main body portion 56*a* and the second load cell 72 are connected to each other by bolts 56*e* so as to be immovable in the first direction P and the second direction Q. Further, the second load cell 72 and the guide 56*b* are connected to each other by bolts 56*f* so as to be immovable in the first direction P and the second direction Q. Further, the slider 56*c* and the fixing jig 80 connected to the shaft body 60 are connected to each other by bolts 56*g* so as to be immovable in the first direction P and the second direction Q. By the above, the second support section 56 makes the second load cell 72 be disposed between the main body portion 56*a* and the moving part 56*d* which makes the shaft body 60 movable in the second direction Q, and supports the other end portion of the shaft body 60 through the fixing jig 80 so as to be movable in the second direction Q while being immovable in the first direction P. Further, in the above description of the first support section 55, the second support section 56, and the like, means for connecting parts so as to be immovable in the first direction P and the second direction Q is not limited to the bolts and known means such as a clamping mechanism or welding is selected.

(Fixing Jig)

Figure 4:
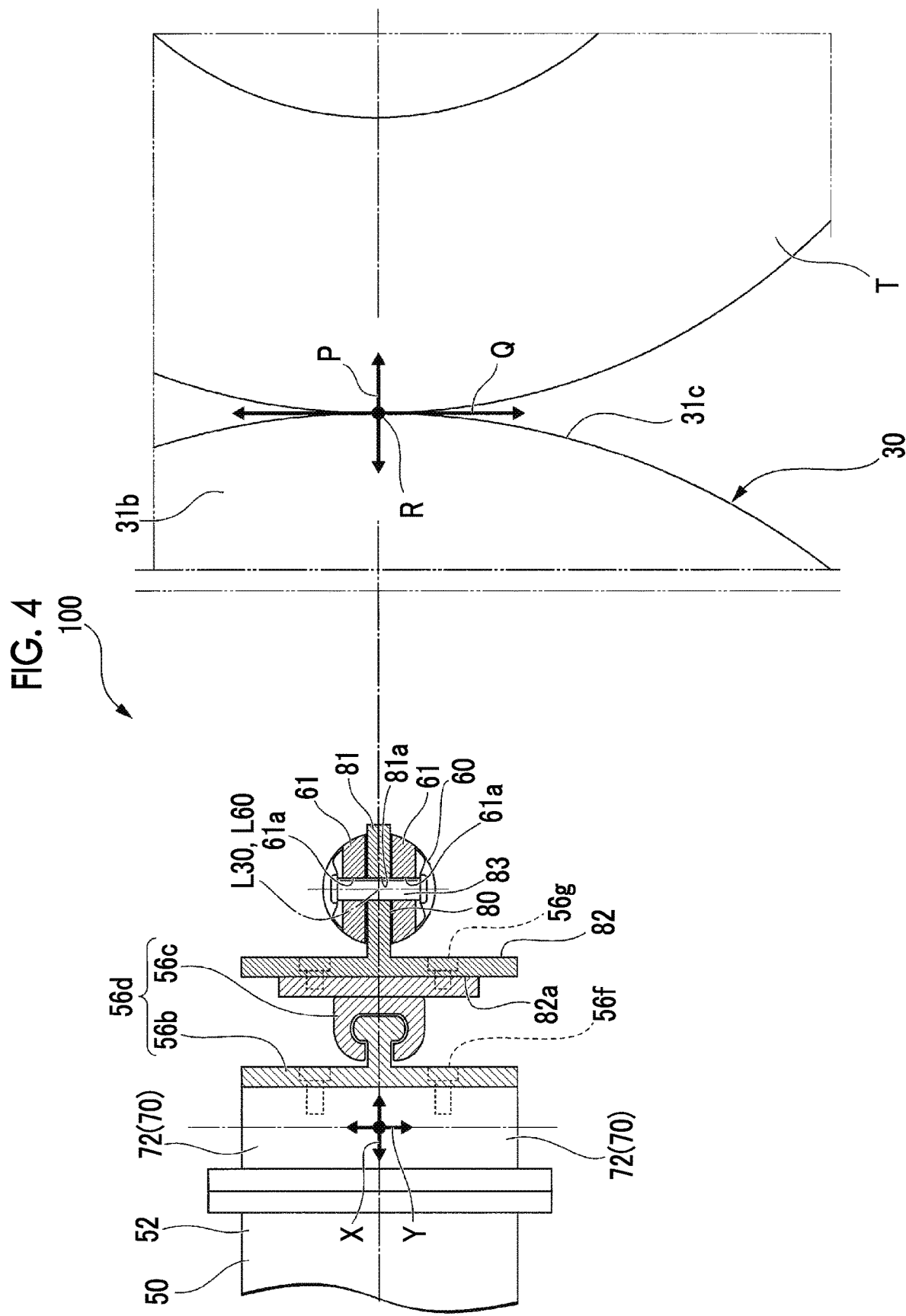
FIG. 4 is a sectional view as viewed from above, showing details of the second load cell portion of the tire uniformity machine according to the first embodiment of the present invention.
Figure 5:
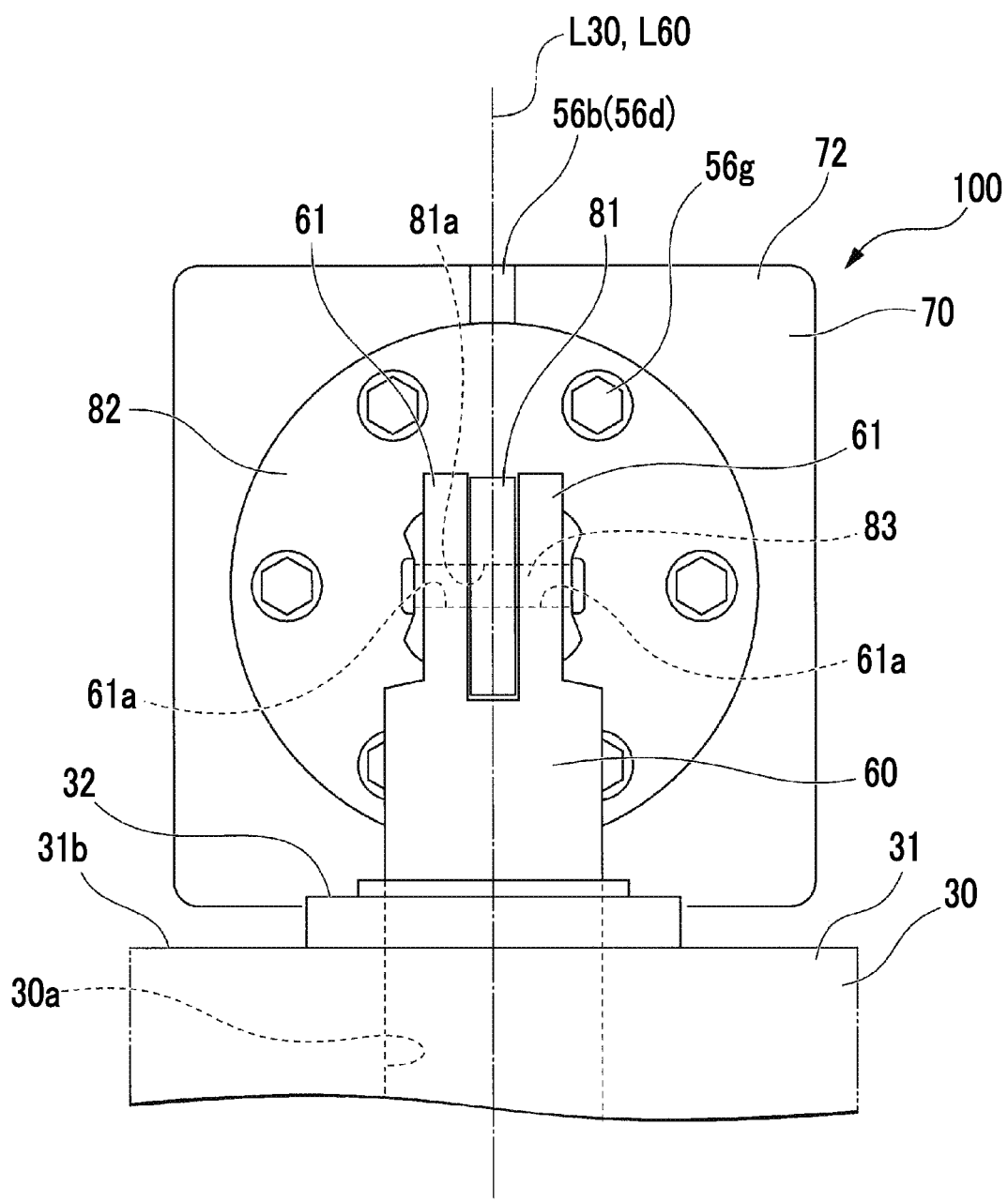
FIG. 5 is a front view as viewed in a first direction, showing details of the second load cell portion of the tire uniformity machine according to the first embodiment of the present invention.

FIGS. 4 and 5 show a state where the fixing jig 80 is connected to the second load cell 72 through the moving part 56*d* on the second load cell 72 side. On the first load cell 71 side, the structure of the fixing jig 80 is the same as that on the second load cell 72 side except that the first load cell 71 is directly fixed to the fixing jig 80, and therefore, description thereof is omitted. As shown in FIGS. 4 and 5, the fixing jig 80 is provided with a second mounting portion 81 mounted on the first mounting portion 61 of the shaft body 60, and a cell mounting portion 82 which is formed in a flange shape fixed to the second mounting portion 81 and on which the second load cell 72 is mounted through the moving part 56*d*. Further, the second mounting portion 81 is formed in plate shape and is inserted between a pair of first mounting portions 61 of the shaft body 60. Further, a communication hole 81*a* is formed in the second mounting portion 81 to correspond to the communication holes 61*a* of the first mounting portions 61. Then, a mounting shaft 83 disposed in the direction orthogonal to the central axes L30 and L60 of the load wheel 30 and the shaft body 60 and orthogonal to the first direction P penetrates the communication holes 61*a* of the pair of first mounting portions 61 and the communication hole 81*a* of the second mounting portion 81, whereby the first mounting portions 61 and the second mounting portion 81 are connected to each other so as to be rotatable relative to each other. In this way, the fixing jig 80 and the second load cell 72 connected to the fixing jig 80 through the moving part 56*d* are connected to the shaft body 60 so as to be rotatable around an axis along the third direction R orthogonal to the first direction P and the second direction Q.

(Control Unit)

Figure 6:
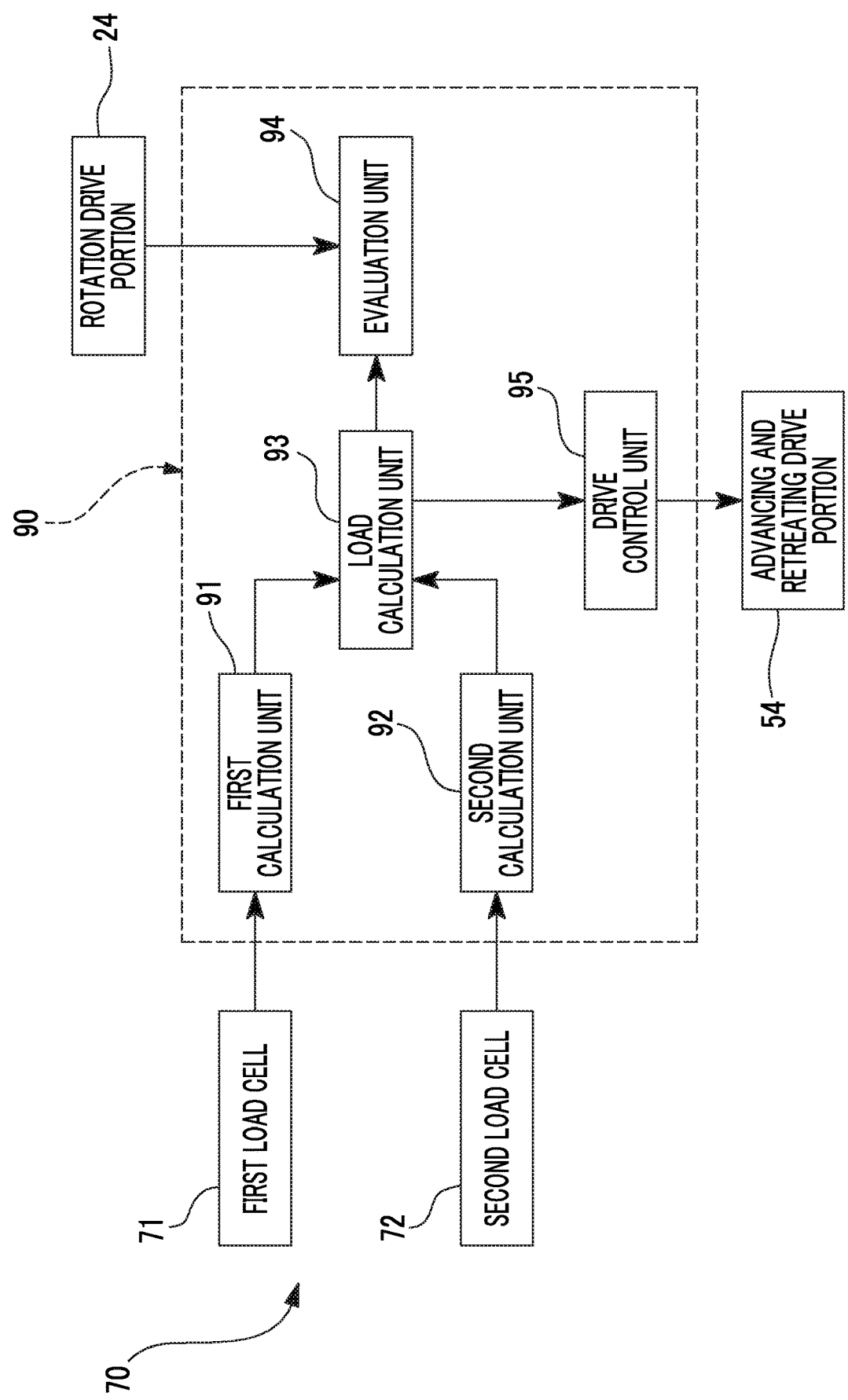
FIG. 6 is a block diagram showing details of control unit of the tire uniformity machine according to the first embodiment of the present invention.

As shown in FIGS. 1 and 6, the control unit 90 drives the advancing and retreating drive portion 54, based on a load setting value and an actual load detection result by the measuring part 70. Specifically, as shown in FIG. 6, the control unit 90 is provided with a first calculation unit 91 which acquires the output value of the first load cell 71 and calculates a force in the X direction and a force in the Y direction, which act on the first load cell 71, a second calculation unit 92 which acquires the output value of the second load cell 72 and calculates a force in the X direction, which acts on the second load cell 72, a load calculation unit 93 which calculates a load in the first direction P and a load in the second direction Q, which act on the load wheel 30, based on the calculation results of the first calculation unit 91 and the second calculation unit 92, an evaluation unit 94 which evaluates non-uniformity of the tire T, based on the calculation result by the load calculation unit 93, and a drive control unit 95 which drives the advancing and retreating drive portion 54. The first calculation unit 91 acquires output of an X direction component and output of a Y direction component from the first load cell 71. Then, the first calculation unit 91 calculates the force in the X direction from the output of the X direction component and calculates the force in the Y direction from the output of the Y direction component. The second calculation unit 92 acquires output of an X direction component and output of a Y direction component from the second load cell 72. Then, the second calculation unit 92 calculates the force in the X direction from the output of the X direction component. In a case where the components in the X direction and the Y direction mutually affect the measured values of the force in the X direction and the force in the Y direction, when calculating the force in the X direction, a correction may be performed by the output value of the Y direction component, and when calculating the force in the Y direction, a correction may be performed by the output value of the X direction component.

The load calculation unit 93 calculates the load in the first direction P, which acts on the load wheel 30, based on the force in the X direction calculated in the first calculation unit 91 and the force in the X direction calculated in the second calculation unit 92. Specifically, the load calculation unit 93 calculates the load in the first direction P by the resultant force of the forces in the X direction calculated in the first calculation unit 91 and the second calculation unit 92. Further, the load calculation unit 93 calculates the load in the second direction Q, which acts on the load wheel 30, based on the force in the Y direction calculated in the first calculation unit 91.

The evaluation unit 94 evaluates the non-uniformity, based on the load in the first direction P and the load in the second direction Q calculated in the load calculation unit 93 and phase information of the tire T, which is correspondingly acquired from the rotation drive portion 24. In the evaluation of the non-uniformity of the tire T, it is possible to evaluate RFV based on the load in the first direction P, and LFV based on the load in the second direction Q. The drive control unit 95 adjusts the push-in amount of the load wheel 30 to the tire T which is rotationally driven, by driving the advancing and retreating drive portion 54 while monitoring the load in the first direction P calculated in the load calculation unit 93, if it receives information about the start of the test. Then, the drive control unit 95 stops the advancement of the load wheel 30 by the advancing and retreating drive portion 54, if the load in the first direction P reaches a setting value set in advance. In this state, by detecting each load while rotating the tire T, it is possible to evaluate the non-uniformity of the tire T.

[Operational Effects]

In the tire uniformity machine 100 of this embodiment, in a state where a main load is applied from the load wheel 30 to the tire T in the first direction P which is one direction in the radial direction and a main load is also applied from the tire T to the load wheel 30 by the reaction force, a variation in a load acting on the load wheel 30 is measured by the measuring part 70. Here, if a force acts on the first load cell 71 and the second load cell 72 from the shaft body 60, the measuring part 70 can measure a component in the first direction P of the force. Further, the measuring part 70 can also measure a component in the second direction Q, based on the force acting on the first load cell 71. Further, even if the load wheel 30 and the shaft body 60 expand or contract in the second direction Q along the central axes L30 and L60 due to a temperature change, the slider 56c moves with respect to the guide 56b, whereby the other end portion of the shaft body 60, which is supported so as to be movable in the second direction Q, can be moved in the second direction Q with one end portion supported by the first support section 55 so as to be immovable in the first direction P and the second direction Q as a base end. For this reason, the force in the second direction Q can be prevented from being detected by the measuring part 70 due to the shaft body 60 being restricted by the first support section 55 and the second support section 56 according to a temperature change. On the other hand, the measuring part 70 can also accurately measure the force acting in the second direction Q, by measuring the force acting in the second direction Q with the first load cell 71 on the side of the first support section 55 which supports the first load cell 71 so as to be immovable in the second direction Q.

Further, in the tire uniformity machine 100 of this embodiment, each of the first load cell 71 and the second load cell 72 is connected to the shaft body 60 through the fixing jig 80 so as to be rotatable around the mounting shaft 83. For this reason, it is possible to suppress a moment around the axis orthogonal to the central axes L30 and L60 from generating in the load wheel 30 and the shaft body 60 due to the inclination of the surface to which the first load cell 71 and the second load cell 72 are fixed or the dimensional change of the load wheel 30 and the shaft body 60 in the second direction Q and thereby affecting the force in the first direction P and the force in the third direction R. Further, as such a structure using the mounting shaft 83, with respect to the pair of first mounting portions 61, the second mounting portion 81 disposed between the pair of first mounting portions 61 is mounted to be rotatable around the mounting shaft 83 with respect to the pair of first mounting portions so as to be disposed in a plane which includes the central axes L30 and L60. For this reason, it is possible to transmit a force from the shaft body 60 to the first load cell 71 and the second load cell 72 while suppressing the generation a moment without eccentricity due to a structure symmetrical with respect to the central axes L30 and L60. Further, in the above, the pair of first mounting portions 61 is provided at the shaft body 60 and the second mounting portion 81 is provided at the fixing jig 80. However, there is no limitation thereto, and even with a configuration in which the second mounting portion 81 is provided at the shaft body 60 and the pair of first mounting portions 61 is provided at the fixing jig 80, the same operational effect can be obtained.

In the embodiment described above, when the moving part 56d is provided between the second load cell 72 and fixing jig 80, the guide 56b is connected to the second load cell 72 and the slider 56c is connected to the fixing jig 80. However, a configuration may be made in which the slider 56c connected to the second load cell 72 and the guide 56b is connected to the fixing jig 80. Further, the moving part 56d is provided between the second load cell 72 and the fixing jig 80. However, there is no limitation thereto. For example, the moving part 56d may be provided between the second load cell 72 and the main body portion 56a. Further, the moving part 56d may be provided at an intermediate portion of the main body portion 56a or an intermediate portion of the fixing jig 80. The moving part 56d is made to be movable in the second direction Q at any one location of at least the frame main body 52 and provided further on the frame math body 52 side than the shaft body 60, whereby a force due to the displacement of the shaft body 60 in the second direction Q does not act on the second load cell 72, and thus the same operational effect is exhibited.

Second Embodiment

Figure 7:
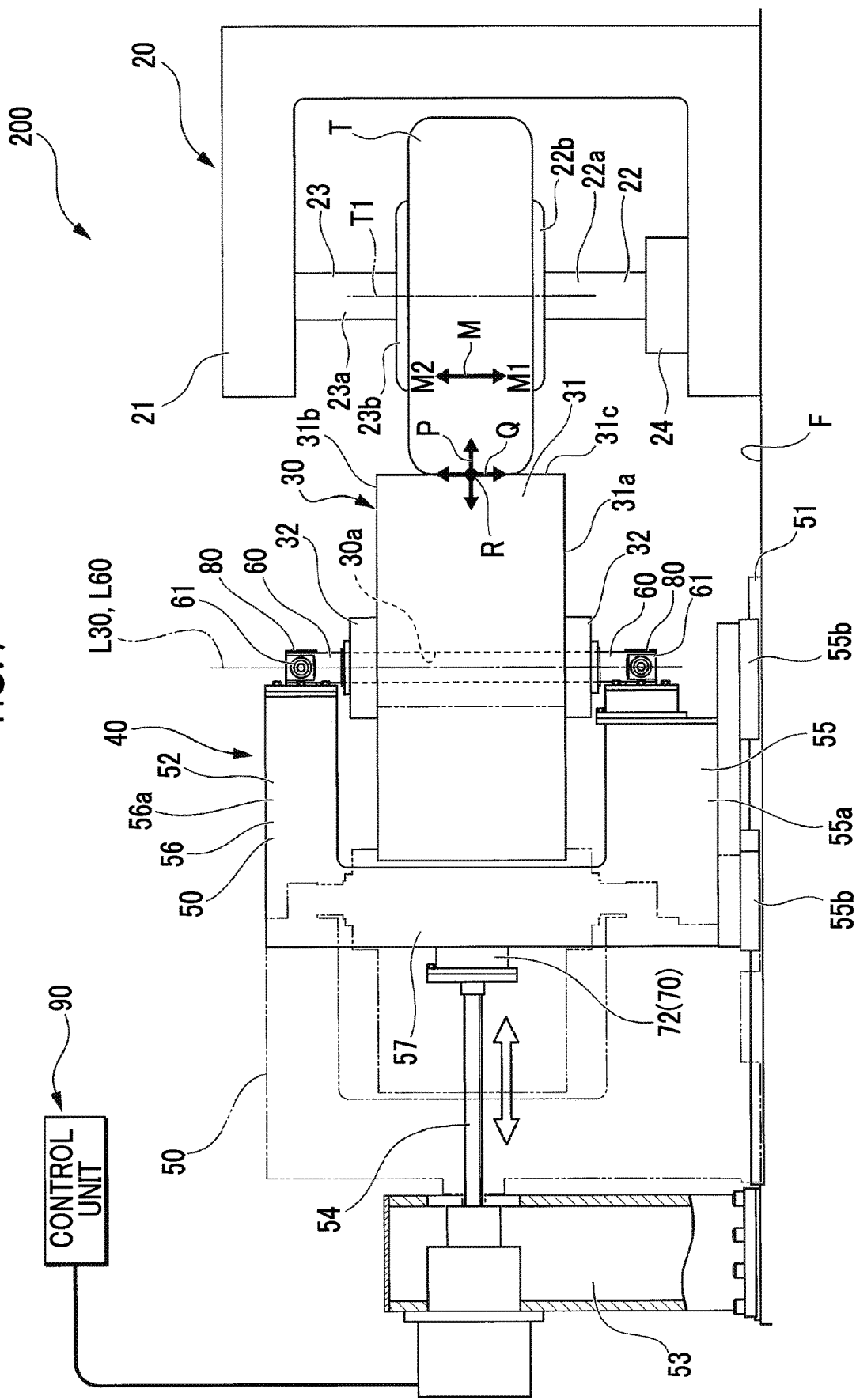
FIG. 7 is a schematic configuration diagram as viewed from the side, showing a tire uniformity machine according to a second embodiment of the present invention.
Figure 8:
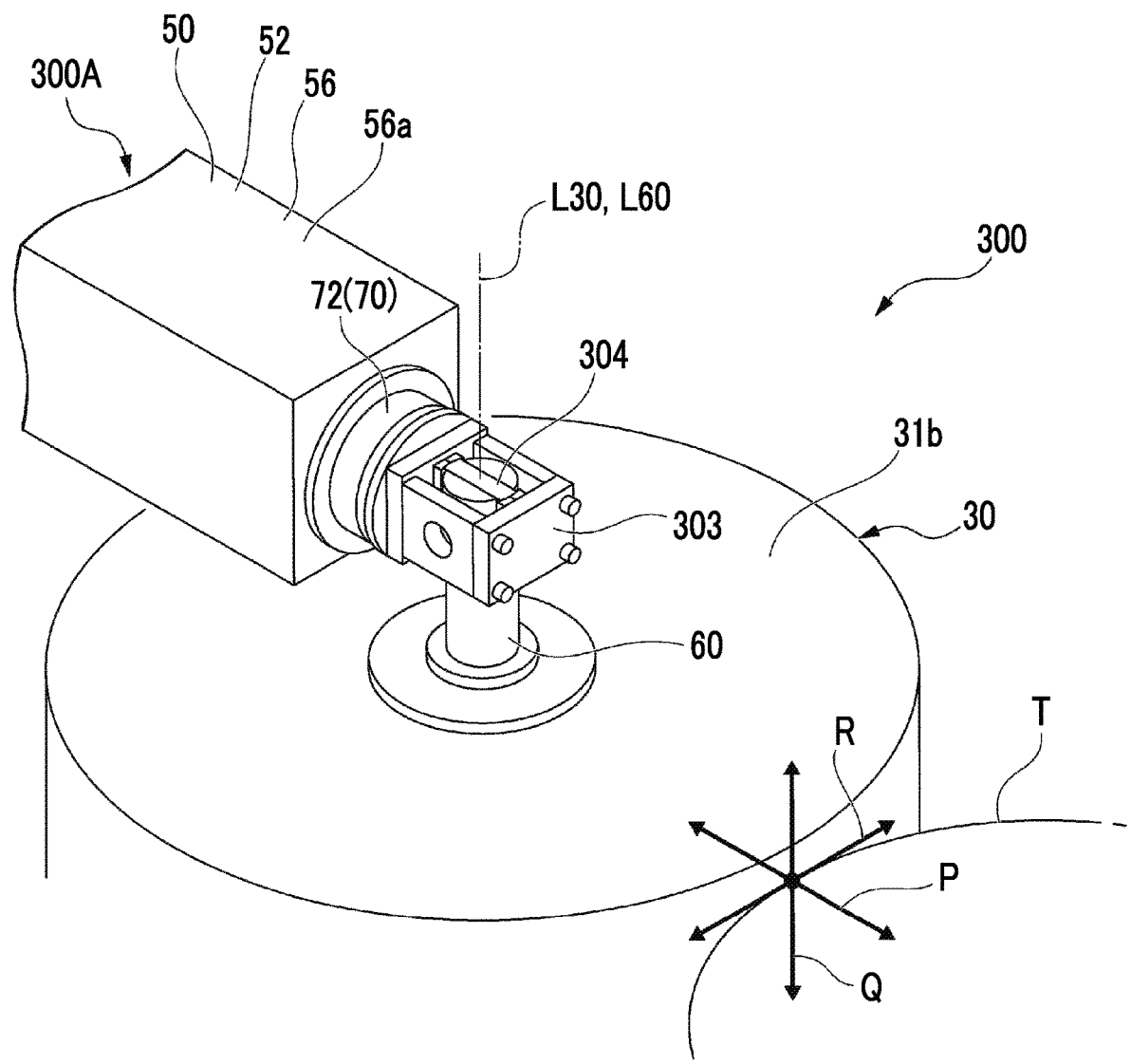
FIG. 8 is a perspective view showing a tire uniformity machine according to a third embodiment of the present invention.

FIG. 7 shows a tire uniformity machine 200 of a second embodiment. The tire uniformity machine 200 of this embodiment is different from the tire uniformity machine 100 of the first embodiment in terms of the disposition of the load cell. Further, in this embodiment, members common to the members used in the above-described embodiment are denoted by the same reference numerals, and description thereof is omitted.

As shown in FIG. 7, in the tire uniformity machine 200 of this embodiment, the second load cell 72 is provided between the third support section 57 and the advancing and retreating drive portion 54. For this reason, a force in the first direction P via the first support section 55 and the second support section 56 from the shaft body 60 acts on the second load cell 72.

In the tire uniformity machine 200 of this embodiment, by calculating a load in the first direction P from the force in the X direction which is detected from the second load cell 72, and calculating a load in the second direction Q from the force in the Y direction which is detected at the first load cell 71, it is possible to evaluate the non-uniformity of the tire T in the same manner.

Third Embodiment

FIGS. 8 to 12 show a tire uniformity machine 300 of a third embodiment. The tire uniformity machine 300 of this embodiment is different from the tire uniformity machine 100 of the first embodiment in terms of the structure of the moving part. Further, in this embodiment, members common to the members used in the above-described embodiments are denoted by the same reference numerals, and description thereof is omitted.

As shown in FIGS. 8 to 11, in the tire uniformity machine 300 of this embodiment, a load wheel support part 300A is provided with a guide 301 rotatably connected to the shaft body 60, a pair of sliders 302 and 302 supported on the guide 301 so to be movable in the second direction Q, and a support 303 to which the pair of sliders 302 is fixed and the second load cell 72 is fixed. In this embodiment, a moving part 304 which supports the shaft body 60 so as to be movable in the second direction Q is configured of the guide 301 and the pair of sliders 302 and 302.

Figure 9:
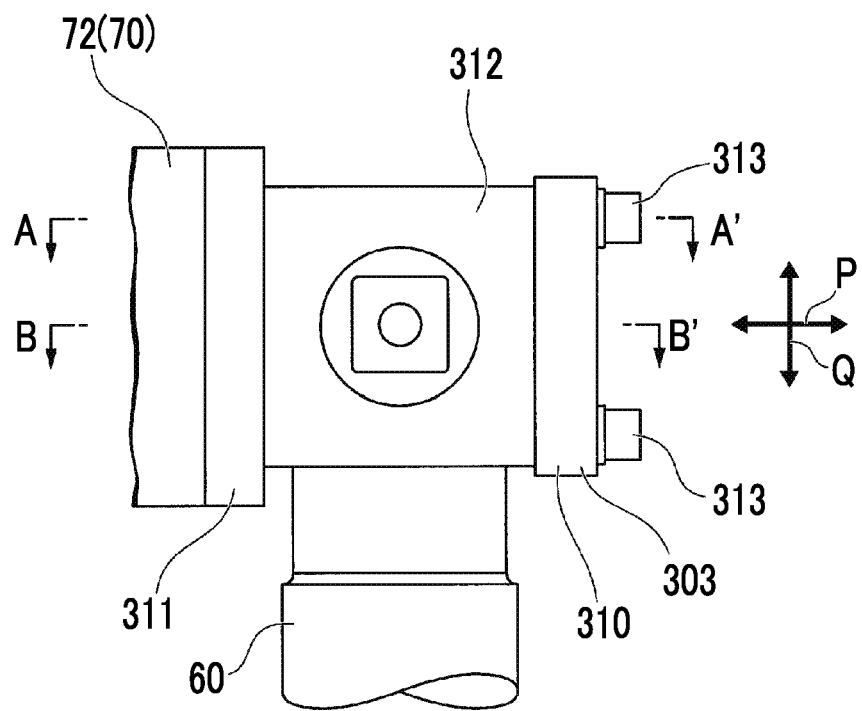
FIG. 9 is a side view showing details of a second load cell portion of the tire uniformity machine according to the third embodiment of the present invention.
Figure 10:
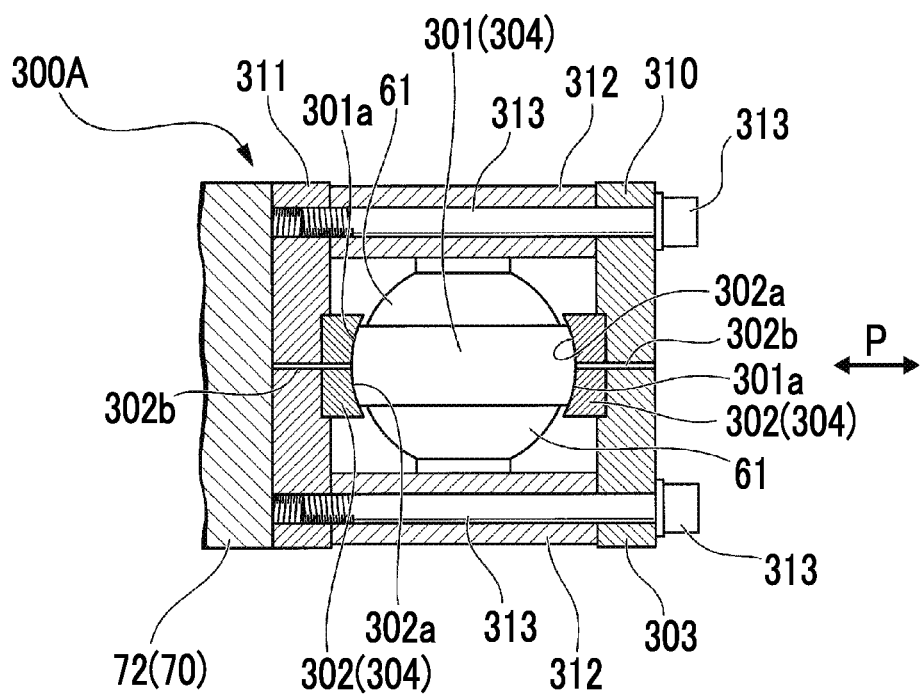
FIG. 10 is a sectional view taken along line A-A' in FIG. 9.
Figure 11:
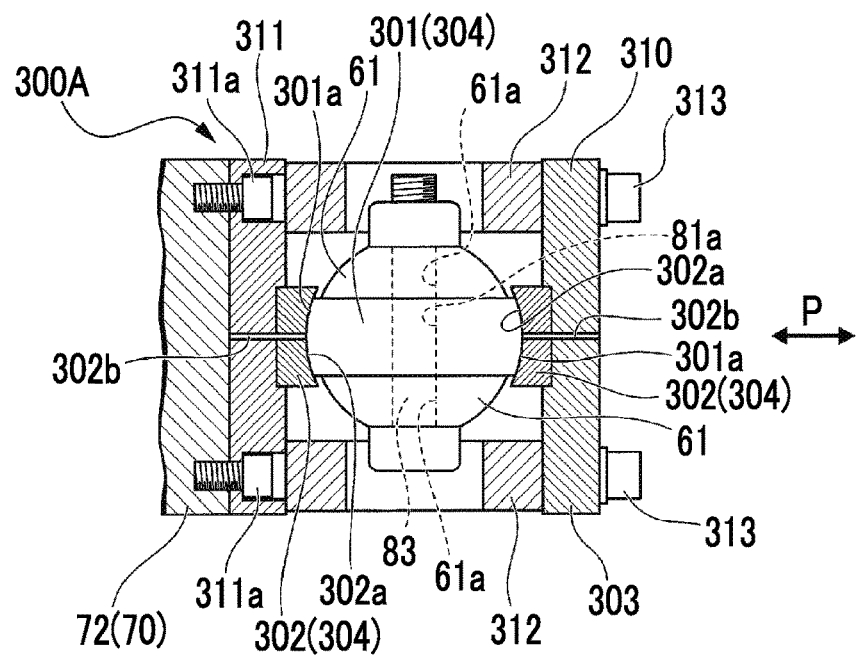
FIG. 11 is a sectional view taken along line B-B' in FIG. 9.
Figure 12:
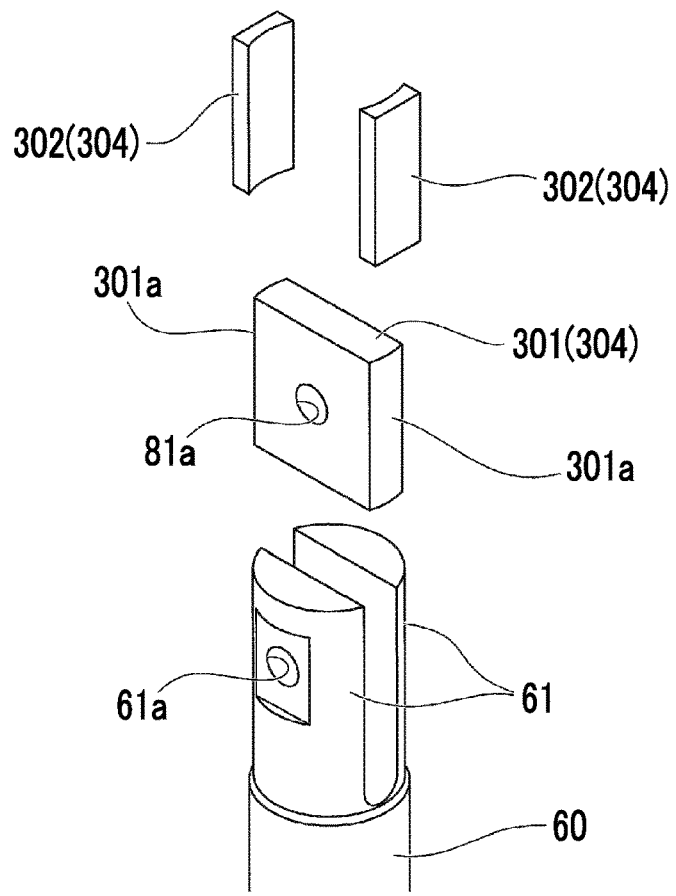
FIG. 12 is an exploded perspective view of a shaft body and a guide in the tire uniformity machine according to the third embodiment of the present invention.

As shown in FIG. 12, the guide 301 is a plate-shaped member alone a plane parallel to the first direction P and the second direction Q. The guide 301 is disposed between the pair of first mounting portions 61 of the shaft body 60. As shown in FIGS. 9 to 11, the communication hole 81a is formed in the guide 301, and the mounting shaft 83 penetrates the communication holes 61a and the communication hole 81a, whereby the first mounting portions 61 and the guide 301 are connected to each other so as to be rotatable relative to each other. Further, both marginal portions disposed along the second direction Q on both sides in the first direction P of the guide 301 configure a pair of guide surfaces 301a and 301a which face in different directions from each other in the first direction P. Each of the pair of guide surfaces 301a and 301a is formed in a convexly curved sectional shape which is convex toward each of the opposite sides in the first direction P, when viewed in a cross section in the second direction Q.

The pair of sliders 302 and 302 is provided corresponding to the pair of guide surfaces 301a and 301a and each have a concavely curved slide surface 302a corresponding to the guide surface 301a. Further, each slider 302 made to be slidable in the second direction Q with the slide surface 302a being in contact with the corresponding guide surface 301a. Here, since the pair of guide surfaces 301a and 301a faces in different directions from each other in the first direction P, the pair of sliders 302 and the guide 301 having the pair of guide surfaces 301a are restricted from moving relative to each other in the first direction P. Further, since the pair of guide surfaces 301a and 301a is formed in a convexly curved sectional shape, as described above, and the slide surface 302a of the slider 302, which comes into contact with the guide surface 301a, is also formed in a corresponding concavely curved shape, the pair of sliders 302 and the guide 301 having the pair of guide surfaces 301a are also restricted from moving relative to each other in the third direction R.

The support 303 is provided with a first support member 310 to which the slider 302 on one side is fixed, a second support member 311 to which the slider 302 on the other side is fixed, a side plate member 312 which is disposed between the first support member 310 and the second support member 311, and a connecting member 313 connecting the first support member 310 and the second support member 311. The first support member 310 and the second support member 311, and the sliders 302 respectively corresponding to the first support member 310 and the second support member 311 are connected to each other so as to be immovable in the first direction P and the second direction Q by connection pins 302b fitted thereto. The second support member 311 and the second load cell 72 are connected to each other by bolts 311a so as to be immovable in the first direction P and the second direction Q. Further, the connecting member 313 is a bolt which is inserted to pass through the first support member 310 and the side plate member 312 and screwed to the second support member 311, and the connecting member 313 is fastened, whereby the first support member 310, the second support member 311, the side plate member 312, and the pair of sliders 302 integrated so as to be immovable in the first direction P and the second direction Q.

In the tire uniformity machine 300 as described above, each of the pair of sliders 302 is supported to be movable in the second direction Q on each of the pair of guide surfaces 301a which faces in different directions from each other in the first direction P orthogonal to the second direction Q, thereby being reliably guided in the second direction Q. Further, also in this embodiment, the guide 301 is connected to the pair of first mounting portions 61 of the shaft body 60 so as to be rotatable around the mounting shaft 83, whereby it is possible to transmit a force from the shaft body 60 to the first load cell 71 and the second load cell 72 while suppressing the generation of a moment.

The embodiments of the present invention have been described above in detail with reference to the drawings. However, the specific configurations are not limited to these embodiments, and design changes or the like within a scope which does not depart from the gist of the present invention are also included.

For example, in the embodiments described above, the first load cell 71 and the second load cell 72 are made to be able to measure two component forces in the X direction and the Y direction orthogonal to each other. However, there is no limitation thereto. As the load cell, a load cell capable measuring component forces in three directions further including a Z direction orthogonal to the X direction and the Y direction, or a load cell capable of measuring six component forces which include a moment around an axis along each direction may be adopted. Further, a load cell capable of measuring one component force may be disposed so as to be able to measure a component force in the first direction P and also be disposed so as to be able to measure a component force in the second direction Q.

Further, in the tire uniformity machine of this embodiment, a configuration is made in which the load cell is connected to the shaft body mounted on the load wheel as a rotating body. However, there is no limitation thereto. A configuration may be adopted in which the load cell is disposed on the shaft body mounted on the tire and the rotation drive portion rotates the load wheel. Further, the central axes of the tire and the load wheel are set to be disposed in the up-down direction. However, there is no limitation thereto. For example, the central axes of the tire and the load wheel may be disposed in the horizontal direction. Further, the rotating body load measuring device is not limited to the tire uniformity machine, and if it is an object to measure forces in at least two directions; the first direction P and the second direction Q, while applying a main load to a columnar rotating body, the present invention can be applied thereto.

Further, in this embodiment, the first load cell is disposed on the lower side of the load wheel and the second load cell is disposed on the upper side which is the other side of the load wheel. However, a configuration may be made in which the first load cell is disposed on the upper side of the load wheel and the second load cell is disposed on the lower side which is the other side of the load wheel.

INDUSTRIAL APPLICABILITY

According to the rotating body load measuring device described above, it is possible to accurately measure a load acting on the rotating body without being affected by a temperature change.

REFERENCE SIGNS LIST

30: load wheel (rotating body)
55: first support section
56: second support section
56a: main body portion
56b, 301: guide
56c, 302: slider
60: shaft body
70: measuring part
71: first load cell
72: second load cell
90: control unit
100, 200, 300: tire uniformity machine (rotating body load measuring device)
301a: guide surface
L60: central axis
P: first direction
Q: second direction

The invention claimed is:

1. A rotating body load measuring device for detecting a force acting on a rotating body that is formed in a columnar shape and rotates around a central axis of a shaft body protruding from a center of each of both end faces, in a state where a main load is applied to the rotating body in a first direction that is one direction in a radial direction, the rotating body load measuring device comprising:
a first support section which supports one end portion of the shaft body, which protrudes from one end face of the rotating body, so as to be immovable in the first direction and a second direction along the central axis;
a second support section which supports the other end portion of the shaft body, which protrudes from the other end face of the rotating body, so as to be immovable in the first direction and movable in the second direction; and
a measuring part which is configured to measure a force acting in the first direction on at least one of the first support section and the second support section from the shaft body and which is configured to measure a force acting in the second direction on the first support section from the shaft body.

2. The rotating body load measuring device according to claim 1,
wherein the measuring part includes
a first load cell which is configured to measure forces acting in at least two directions of the first direction and the second direction and connected to the first support section and the one end portion of the shaft body so as to be immovable in the first direction and the second direction, and
a second load cell which is configured to measure a force acting in at least one direction of the first direction and connected to the other end portion of the shaft body, and
the second support section includes
a main body portion to which the second load cell is connected so as to be immovable in the first direction and the second direction,
a guide connected to one of the shaft body and the second load cell so as to be immovable in the first direction and the second direction and disposed along the second direction, and
a slider connected to the other of the shaft body and the second load cell so as to be immovable in the first direction and the second direction and supported on the guide so as to be movable in the second direction.

3. The rotating body load measuring device according to claim 2,
wherein the guide includes a pair of guide surfaces disposed along the second direction so as to face in different directions from each other in a direction orthogonal to the second direction, and
a pair of the sliders is each provided so as to be supported to be movable in the second direction on each of the pair of guide surfaces.

4. The rotating body load measuring device according to claim 3, further comprising:
a control unit which is configured to calculate a load acting on the rotating body, based on measurement results of the first load cell and the second load cell,
wherein the control unit calculates a load acting in the first direction on the rotating body, based on forces in the first direction measured by the first load cell and the second load cell, and calculates a load acting in the second direction on the rotating body, based on a force in the second direction measured by the first load cell.

5. The rotating body load measuring device according to claim 4,
wherein the rotating body load measuring device is a tire uniformity machine which includes
a tire that is a test object supported to be rotatable around a tire central axis,
a columnar load wheel supported to be rotatable around an axis parallel to the tire central axis, so as to come into contact with a peripheral surface of the tire, and
a rotation drive portion that is configured to rotationally drive either of the tire or the load wheel, and
measures non-uniformity of the tire, based on a force that is measured in the measuring part with one of the tire and the load wheel as the rotating body and a load acting from the other of the tire and the load wheel as the main load.

6. The rotating body load measuring device according to claim 3,
wherein the rotating body load measuring device is a tire uniformity machine which includes
a tire that is a test object supported to be rotatable around a tire central axis, a columnar load wheel supported to be rotatable around an axis parallel to the tire central axis, so as to come into contact with a peripheral surface of the tire, and a rotation drive portion that is configured to rotationally drive either of the tire or the load wheel, and measures non-uniformity of the tire, based on a force that is measured in the measuring part with one of the tire and the load wheel as the rotating body and a load acting from the other of the tire and the load wheel as the main load.

7. The rotating body load measuring device according to claim 2, further comprising:

a control unit which is configured to calculate a load acting on the rotating body, based on measurement results of the first load cell and the second load cell, wherein the control unit calculates a load acting in the first direction on the rotating body, based on forces in the first direction measured by the first load cell and the second load cell, and calculates a load acting in the second direction on the rotating body, based on a force in the second direction measured by the first load cell.

8. The rotating body load measuring device according to claim 7, wherein the rotating body load measuring device is a tire uniformity machine which includes a tire that is a test object supported to be rotatable around a tire central axis, a columnar load wheel supported to be rotatable around an axis parallel to the tire central axis, so as to come into contact with a peripheral surface of the tire, and a rotation drive portion that is configured to rotationally drive either of the tire or the load wheel, and measures non-uniformity of the tire, based on a force that is measured in the measuring part with one of the tire and the load wheel as the rotating body and a load acting from the other of the tire and the load wheel as the main load.

9. The rotating body load measuring device according to claim 2, wherein the rotating body load measuring device is a tire uniformity machine which includes a tire that is a test object supported to be rotatable around a tire central axis, a columnar load wheel supported to be rotatable around an axis parallel to the tire central axis, so as to come into contact with a peripheral surface of the tire, and a rotation drive portion that is configured to rotationally drive either of the tire or the load wheel, and measures non-uniformity of the tire, based on a force that is measured in the measuring part with one of the tire and the load wheel as the rotating body and a load acting from the other of the tire and the load wheel as the main load.

10. The rotating body load measuring device according to claim 1, wherein the rotating body load measuring device is a tire uniformity machine which includes a tire that is a test object supported to be rotatable around a tire central axis, a columnar load wheel supported to be rotatable around an axis parallel to the tire central axis, so as to come into contact with a peripheral surface of the tire, and a rotation drive portion that is configured to rotationally drive either of the tire or the load wheel, and measures non-uniformity of the tire, based on a force that is measured in the measuring part with one of the tire and the load wheel as the rotating body and a load acting from the other of the tire and the load wheel as the main load.

* * * * *